Aug. 6, 1946. C. H. SCHURR 2,405,522
MACHINE TOOL
Filed April 1, 1942 7 Sheets-Sheet 6
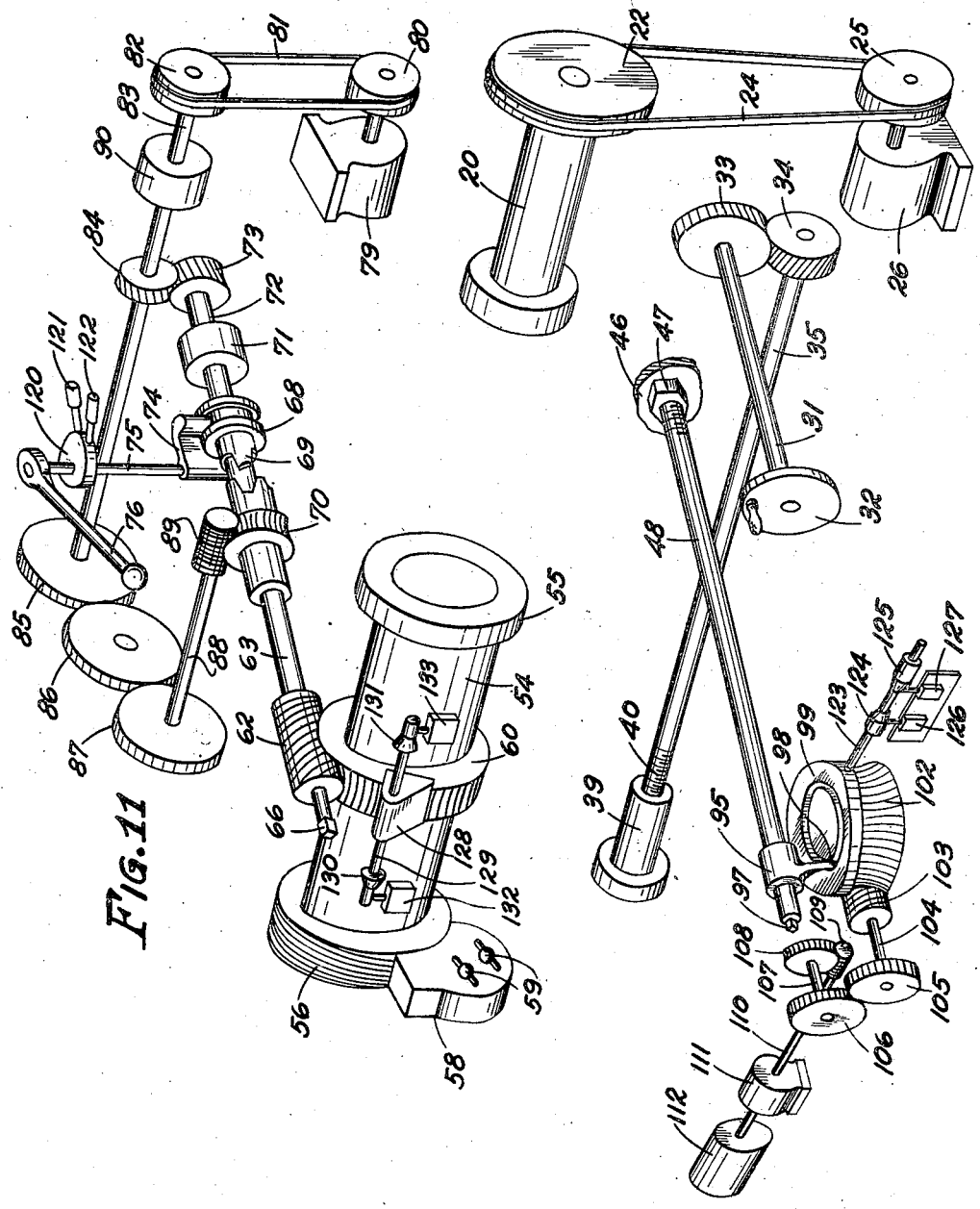
INVENTOR:
Charles H. Schurr
BY Hawgood and Van Horn
HIS ATTORNEYS Aug. 6, 1946.    C. H. SCHURR    2,405,522
MACHINE TOOL
Filed April 1, 1942    7 Sheets-Sheet 7

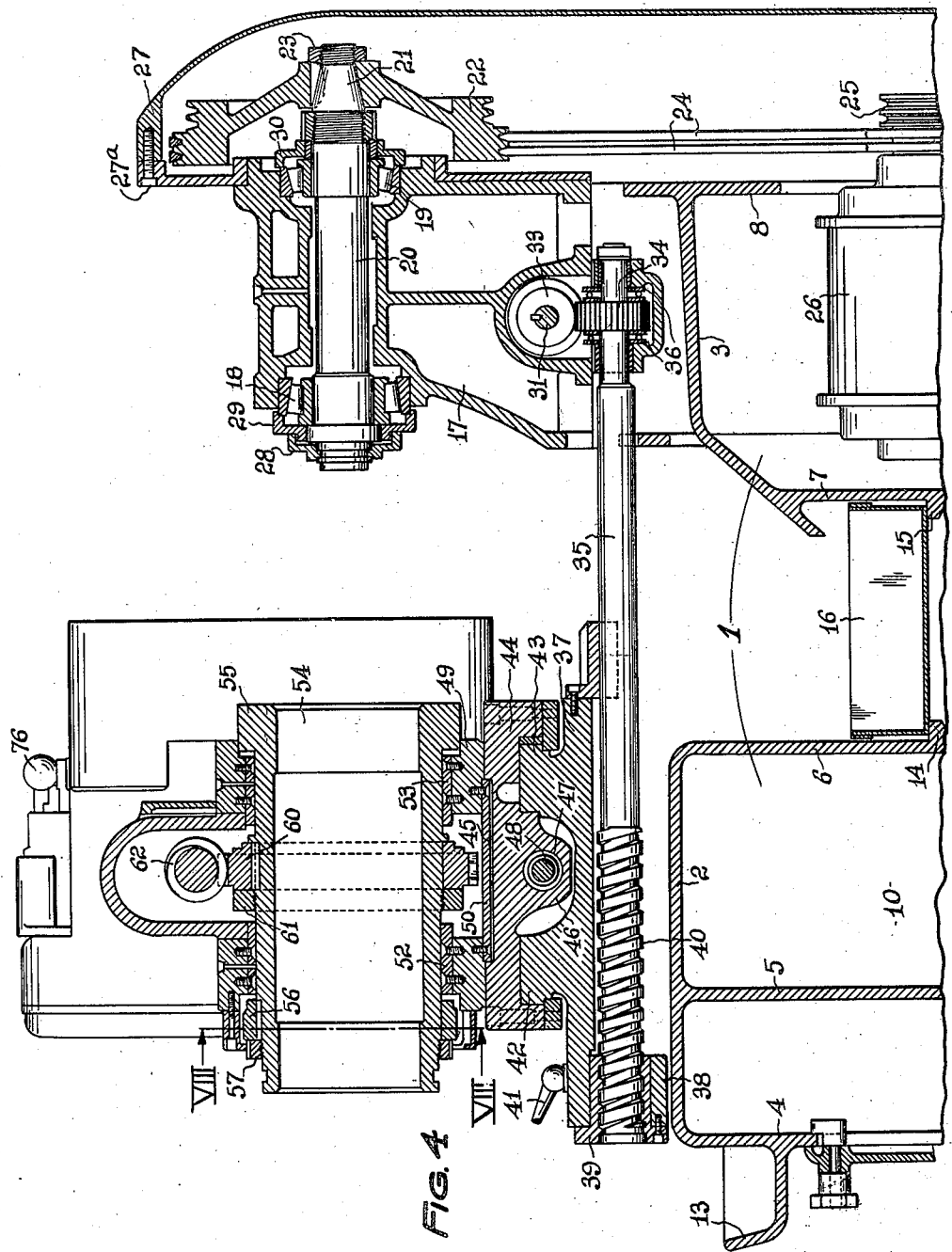

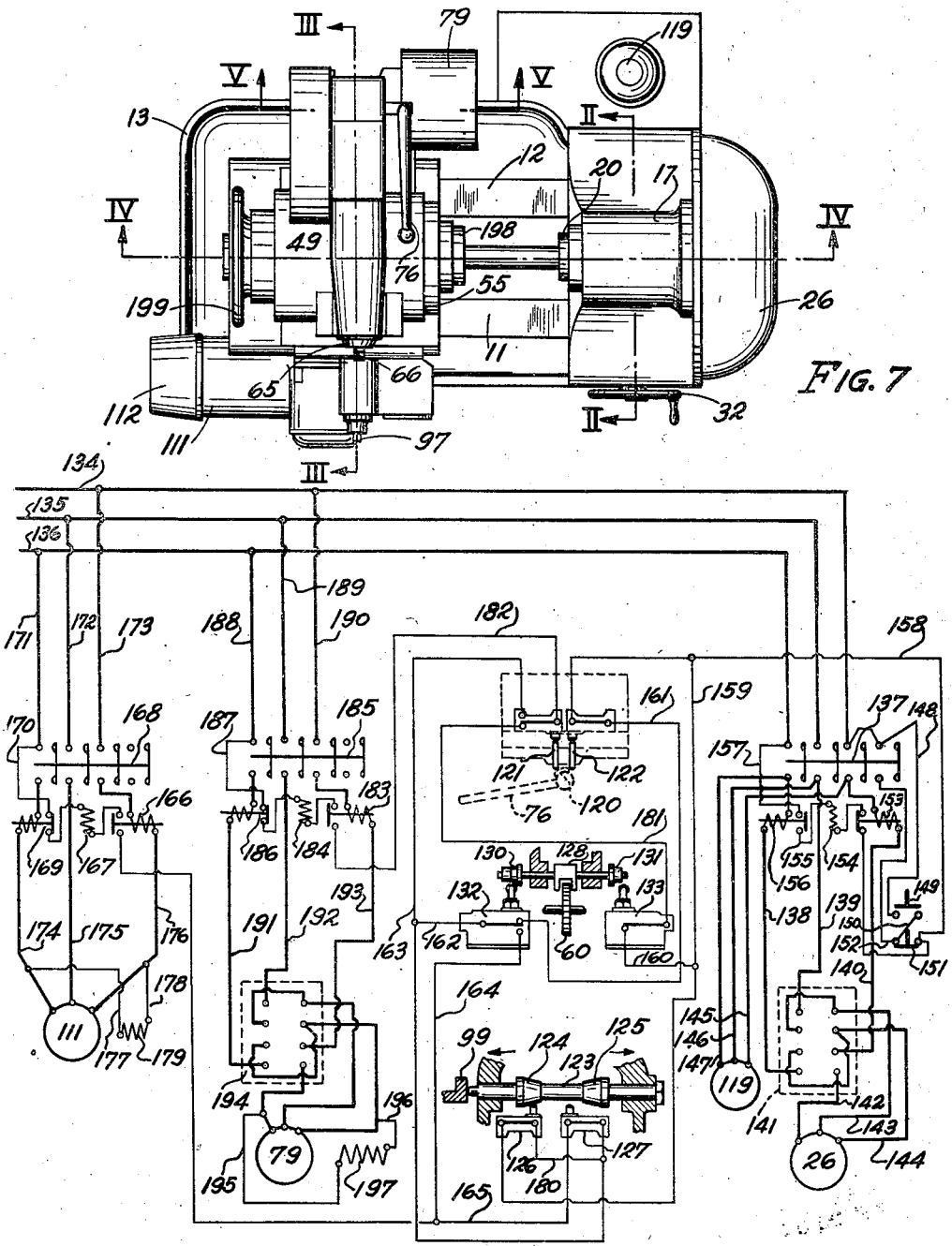

INVENTOR:
Charles H. Schurr
BY Hawgood and Van Horn
HIS ATTORNEYS.

Patented Aug. 6, 1946

2,405,522

UNITED STATES PATENT OFFICE 2,405,522

MACHINE TOOL

Charles H. Schurr, Cleveland, Ohio, assignor to The Lees-Bradner Company, Cleveland, Ohio, a corporation of Ohio Application April 1, 1942, Serial No. 437,112

17 Claims. (Cl. 90—11.62)

This invention relates to a machine tool, and particularly to a tool which is adapted to the accurate forming of surfaces on metal and like materials.

An object of the invention is to provide an improved machine tool which will form non-cylindrical surfaces with extreme accuracy.

Another object is to provide an improved machine tool which will be of simple and rugged construction.

Another object is to provide an improved machine tool which will require relatively few moving parts.

Another object is to provide an improved machine tool which will have extremely little back lash or looseness.

Another object is to provide an improved machine tool which will occupy relatively small floor space.

Another object is to provide an improved machine tool which will be neat and compact.

Another object is to provide an improved machine tool which may be easily operated.

Another object is to provide an improved machine tool which may be quickly and easily adjusted to accommodate itself to performing different operations.

Another object is to provide an improved machine tool which may be readily and economically manufactured.

Another object is to provide an improved machine tool which shall be both quick and efficient in its operation.

Other objects will hereinafter appear.

The invention will be better understood from the description of one practical embodiment thereof, illustrated in the accompanying drawings, in which:

Figure 4 is a longitudinal sectional view taken on the line IV—IV of Figure 3;

Figure 7 is a plan view of a machine to a smaller scale than that to which the parts are shown in the preceding figures;

Figure 11 is a diagrammatic view of the various driving connections of the apparatus of the preceding figures; and Figure 12 is a diagrammatic illustration of the electric circuits involved.

Figure 1:
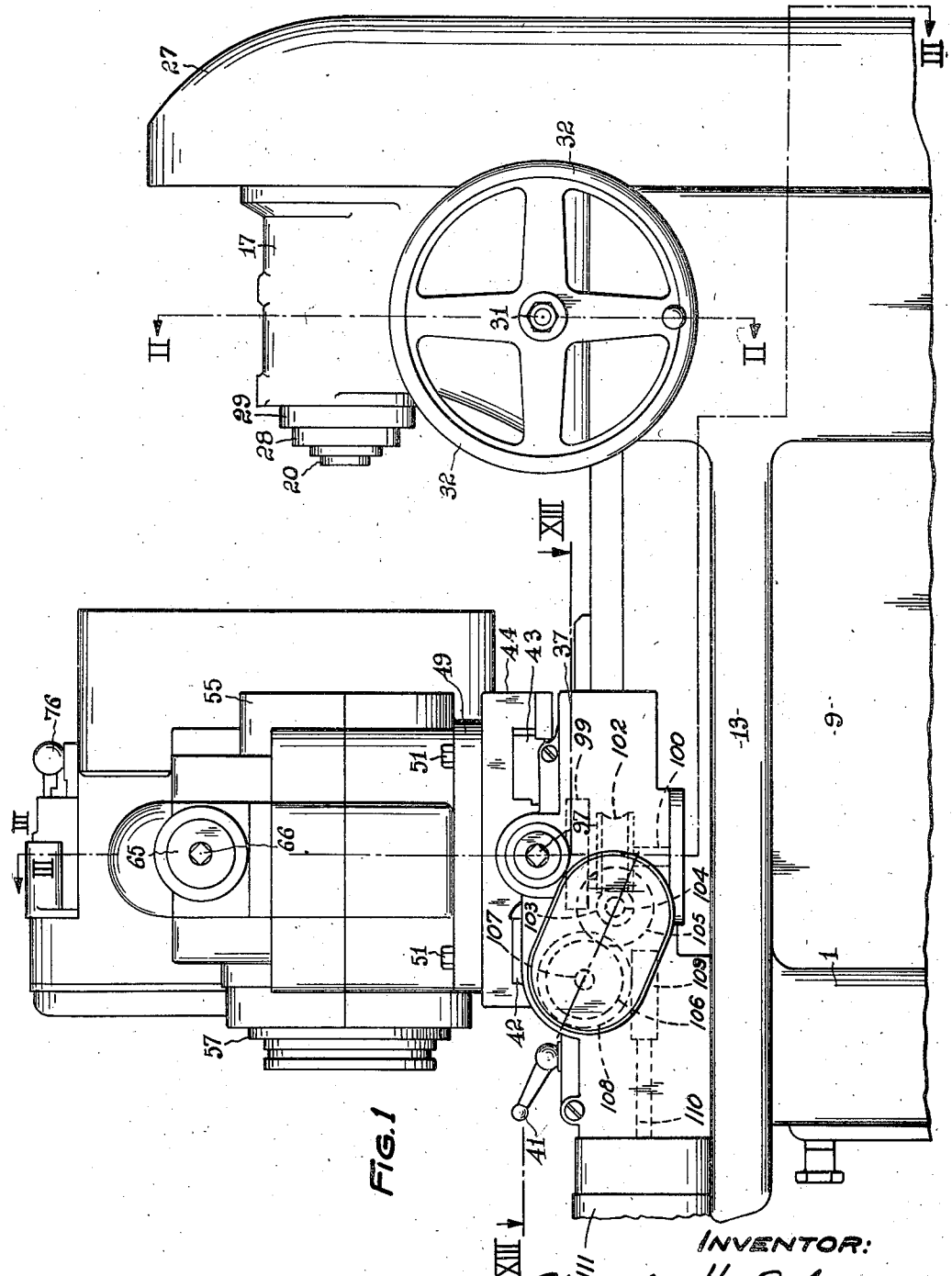
Figure 1 is a front elevational view of a machine tool, the type chosen for illustration being that commonly called a thread milling machine, embodying the invention, parts of the base being broken away.
Figure 2:
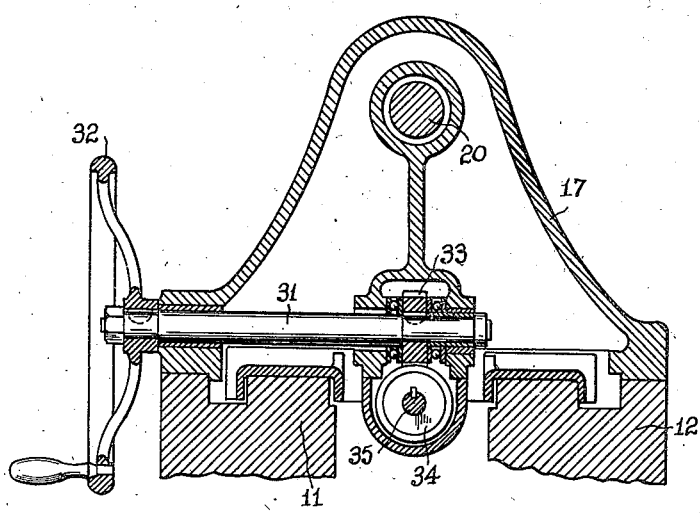
Figure 2 is a transverse fragmentary sectional view taken on the line II—II of Figure 1.
Figure 8:
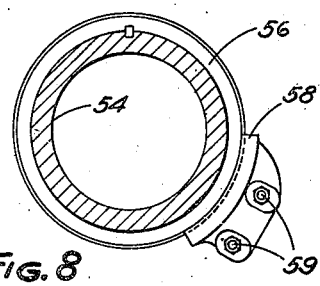
Figure 8 is an enlarged fragmentary cross sectional view of the automatic feeding device taken on the line VIII—VIII of Figure 4.
Figure 5:
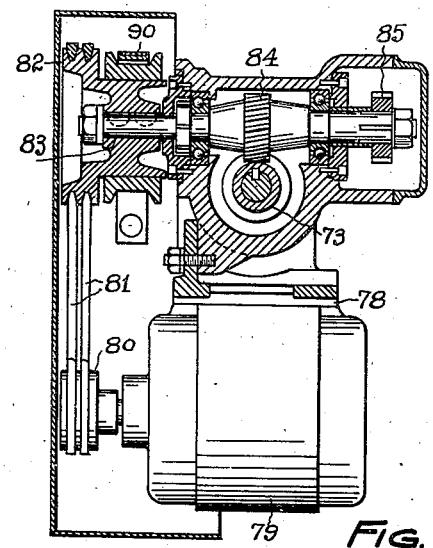
Figure 5 is a fragmentary sectional view taken on the line V—V of Figure 3.
Figure 6:
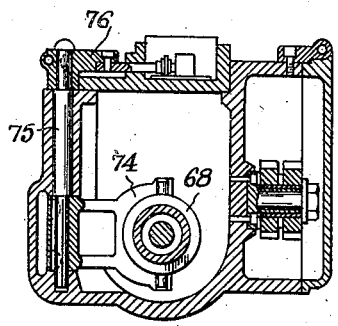
Figure 6 is a fragmentary sectional view taken on the line VI—VI of Figure 3.
Figure 10:
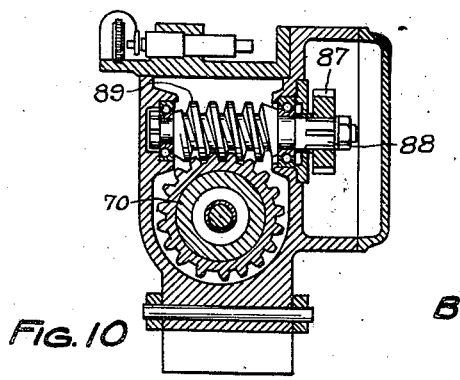
Figure 10 is a fragmentary sectional view taken on the line X—X of Figure 3.
Figures 3, 9:
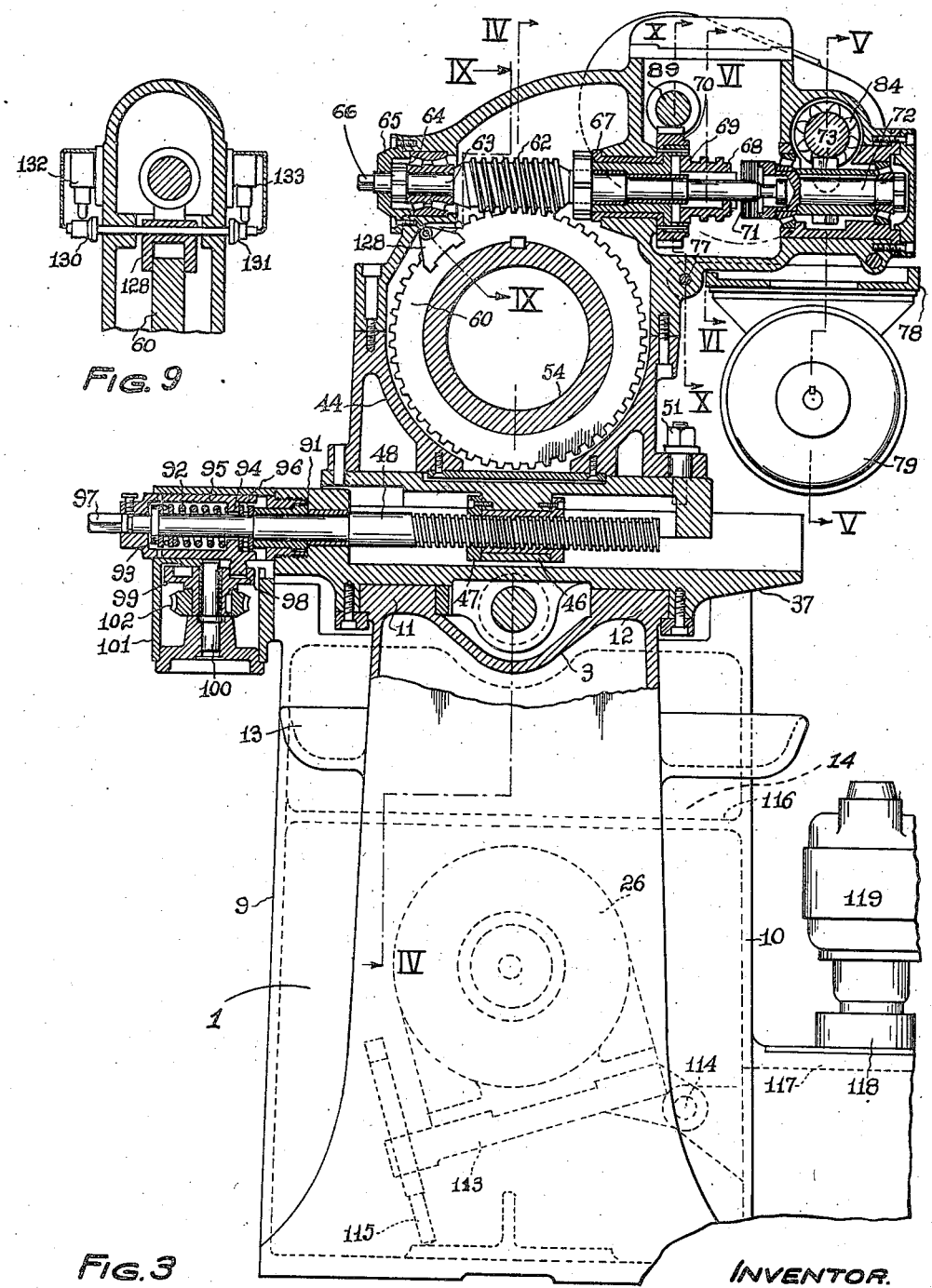
Figure 3 is a partially elevational and partially transverse view taken on the line III—III of Figure 1.
Figure 9 is a fragmentary sectional view taken on the line IX—IX of Figure 3.
Figure 13:
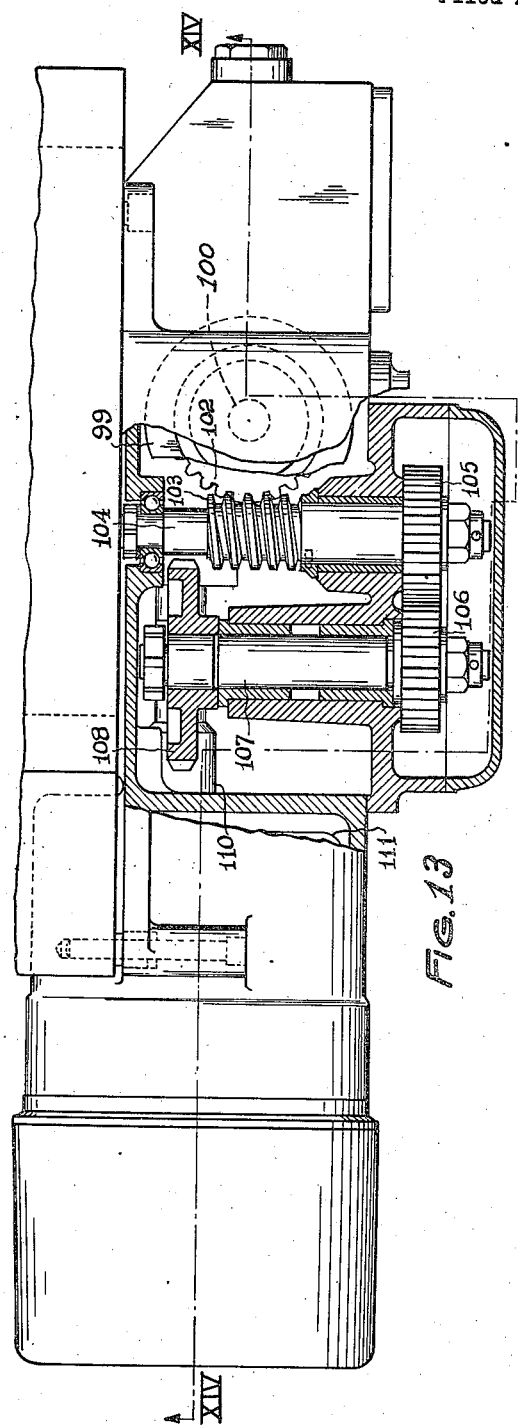
Figure 13 is a view partly in plan and partly in section, taken on the line XIII—XIII of Figure 1.
Figure 14:
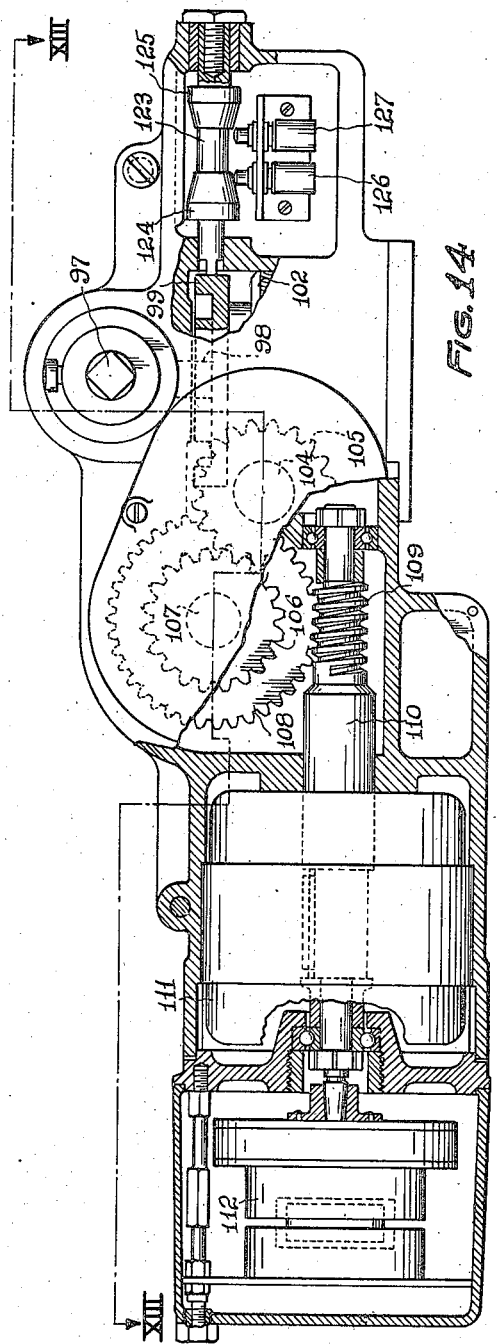
Figure 14 is an elevational view, partly in section, taken on the line XIV—XIV of Figure 13.

In Figure 1, the machine is shown as having a supporting base or pedestal 1, this conveniently being, as shown, a hollow casting opening toward its bottom and having spaced top walls 2 and 3 and transverse webs or walls 4, 5, 6, 7 and 8, and front and back walls 9 and 10.

Upon the upper surfaces of the top walls 2 and 3 are formed, integrally therewith, longitudinally extending ways 11 and 12.

Extending along the front, rear, and one end of the base is a trough 13, formed integrally therewith, which opens into a central depressed space between walls 6 and 7, these walls being provided with horizontal flanges 14 and 15 upon which a rectangular container 16 is supported for the reception of chips, this container being movable like a drawer into and out of the space between the walls 6 and 7 for convenience in removal of the chips.

Mounted upon the ways 11 and 12 are a work head and a cutter head.

The latter is shown to the right in Figures 1 and 4, and consists of a supporting bracket indicated generally at 17 provided with bearings 18 and 19 in which is supported, with its axis generally parallel to the ways, a tool spindle 20.

The end of the tool spindle projects at 21 beyond the end of the base and is provided with a pulley 22 keyed to it and held upon the tapered end 21 of the spindle as by a nut 23, this pulley being shown as grooved for the use of a double V-belt 24.

The belt is driven from a pulley 25 fixed to the shaft of a motor 26 located within the space in the base defined by walls 7 and 8, top 3, and between front 9 and back 10.

The pulleys and belt are protected by a cover 27 secured to the base and the work head by screws 27a. The spaces between the spindle and head are covered by rings 28, 29 and 30, which retain lubricant in the bearings and prevent the entry of chips, dirt, and the like.

Journalled in the cutter head is a transverse shaft 31 provided on its outer end with a hand wheel 32 and having keyed to it a skew gear 33.

This meshes with a skew gear 34 keyed to a lead screw 35 which extends lengthwise of the machine to substantially the remote (or left hand) end of the bed. The lead screw is prevented from axial movement by thrust bearings 36.

The work head is shown to the left in Figures 1 and 4, and includes a carriage 37 slidable upon ways 11 and 12. The carriage has a depending boss 38 in which is secured a nut 39, engaging the threads 40 of the lead screw 35, by which the carriage may be moved upon its ways.

A locking screw and handle 41 are provided for clamping the carriage at any desired adjusted position.

The upper surface of the carriage is formed with transverse ways 42 and 43, upon which is slidably mounted a transversely movable slide 44 having a flat upper surface provided with a central circular depression 45.

The lower surface of the slide has a depending boss 46, movable in the space between the ways 42 and 43, provided with a nut 47 engaging the threads of a screw 48 for moving the slide upon the carriage.

The operation of this screw will be described more fully hereinafter.

Upon the upper surface of the slide is a frame 49 having a circular plate 50 attached to it, this fitting closely within the recess 45 so that the frame may be angularly adjusted with respect to the slide. This adjustment is permitted by machine screws 51 threaded into the slide and extending through arcuate slots in the lower portion of the frame 49.

The frame carries spaced bearings 52 and 53, in which is rotatably and slidably mounted a hollow work spindle 54. This spindle on its end adjacent the cutter head has an outwardly extending flange 55 which limits its axial motion in one direction.

At the other end the work spindle has keyed to it a removable externally threaded ring 56 held in place by an internally threaded ring or nut 57.

The external thread of ring 56 is engaged by a conjugate thread cut into a segmental shoe 58 detachably secured to the frame by screws 59.

Also keyed to the exterior of the spindle 54 is a gear 60, held in place by an internally threaded ring or nut 61, which gear meshes with a worm 62 formed integrally with a transversely extending shaft 63.

This shaft is supported at its forward end in bearings 64 carried by the frame, the end of the shaft projecting through a cap 65 and being squared, as indicated at 66, for the application of a wrench or the like in effecting adjustments.

Shaft 63 is journalled at 67 within the frame and has splined to it a clutch member 68. This clutch member is provided on one end with a jaw clutch element 69 engageable with a corresponding jaw element fixed to a skew gear 70.

The other end of clutch member 68 is arranged to cooperate with a disc friction clutch 71, by which the shaft 63 may be connected with a shaft 72 in axial alignment therewith and provided with a skew gear 73.

The clutch member 68 may be moved in either direction by a yoke 74 carried by a vertical shaft 75 which extends upwardly through the top of the frame and is provided on its outer end with a hand lever 76.

On the rear part of the frame is hinged at 77 a bracket 78 carrying a motor 79, the shaft of which is provided with a pulley 80 over which pass V-belts 81 to a pulley 82 fixed to a longitudinally extending shaft 83.

This shaft has secured to it a skew gear 84 meshing with skew gear 73, and at its outer end detachably connected to it one of a series of change gears 85 which drives, through an idler gear 86, another change gear 87 detachably secured to the shaft 88 which in turn has formed upon it a worm 89, the latter meshing with worm wheel 70.

Thus, it will be apparent that the work spindle may be driven at either of two speeds, controlled by the position of lever 76.

If the jaw clutch 69 is engaged, the drive is from motor 79 through pulley 80, belts 81, pulley 82, shaft 83, change gears 85, 86, and 87 to shaft 88, thence through worm 89 to worm wheel 70 which is now clutched to the shaft 63 and so in turn drives the worm 62, rotating the gear 60 and with it the spindle at a speed suitable for cutting.

As the spindle rotates, the threaded ring 56, traveling upon the fixed shoe 58 moves the spindle axially by an amount determined by the lead of the threads of parts 56 and 58. If a different axial feed is desired, these two parts may be readily replaced by others having the proper lead.

If, however, the lever 76 is moved in the opposite direction, it disengages jaw clutch 69 and engages friction clutch 71. Now power is transmitted from shaft 83 through skew gears 84 and 73 to shaft 72, through clutch 71 to shaft 63, and it will be apparent that the latter now is driven at a substantially higher rate of speed than when the jaw clutch is engaged.

It also is driven preferably in a reverse direction, thus providing a quick return, moving the spindle to its initial position.

In practice, a spring is provided for rotating shaft 75 in the direction to engage the jaw clutch elements 69, so that the operator may move the lever into position to engage the friction clutch 71, and, when the return motion has been completed, merely releases the lever, whereupon the spring will cause the engagement of the jaw clutch elements 69, so that he need not hold these elements engaged while the cut is being performed.

A brake 90 is provided on a shaft 83, this being electrically controlled to stop the parts, as will be more fully described hereinafter.

The forward end of screw 48 is journalled in the carriage 37 as indicated at 91, the screw having a shoulder which abuts the journal and so limits its outward movement.

Beyond the journal the screw shank is surrounded by a compression spring 92 bearing at one end against a collar 93 secured to screw 48 and at its other end against a flange 94 formed within a sleeve 95, the other side of this flange bearing upon a thrust bearing 96, which, in turn, abuts the journal 91.

The outer end of the screw is squared as indicated at 97 for the reception of a hand wheel, crank, or the like, by which the screw may be rotated for adjustments, or, if desired, to impart a manual feed.

A depending boss 98 is formed integrally with the sleeve 95 and enters a groove in a cam 99. The cam is secured to a short vertical shaft 100 which is pivoted in a casing 101 secured to the front of the carriage.

Fixed to the cam is a worm wheel 102 meshing with the worm 103 upon a shaft 104.

To the outer end of the shaft is attached a change gear 105 meshing with a change gear 106 detachably fixed to a short horizontal shaft 107, the inner end of which is provided with a worm wheel 108 driven by the worm 109 formed in the shaft 110 of a motor 111.

Fixed to the other end of the motor shaft is a brake 112.

The functioning of these parts will more fully appear from the description of the operation of the machine.

It will be noted that the motor 26 is mounted upon a plate 113, pivoted at 114 within the base, and having supporting screws 115 threaded through its free end, whereby the amount of weight imposed upon belts 24 may be adjusted to maintain these belts at any desired tension.

The recess between walls 6 and 7 terminates at a nearly horizontal bottom wall 116 which permits coolant fluid to flow down into a sump 117 formed in the rear of the base.

A cam 120 is fixed to shaft 75, and two switches 121 and 122 are arranged to be alternately actuated by this cam as the lever 76 is moved from one side to the other.

The external surface of cam 99 is formed into an additional cam surface contacting the end of a horizontal rod 123 provided with two adjustable conical collars 124 and 125 which are respectively arranged to actuate switches 126 and 127 in accordance with the rotation of cam 99.

A forked follower 128 embraces the gear 68, this follower being fixed to a rod 129 provided with two conical collars 130 and 131, these being positioned to actuate switches 132 and 133, respectively.

Thus, it will be seen that the switches 121 and 122 are controlled by the position of the lever 76; 126 and 127 are controlled by the position of cam 99, and, consequently, in accordance with the position of the slide upon the carriage and switches 132 and 133 are controlled by the axial movement of the spindle in its bearings.

The switches and motor are connected as indicated in Figure 12.

Current is supplied from a power line or generator through conductors 134, 135 and 136, passing through a magnetic switch 137 to conductors 138, 139 and 140, which connect, through a manually operable reversing switch indicated generally at 141, with conductors 142, 143 and 144, respectively, connected to the motor 26.

Also connected to the switch 137 are conductors 145, 146 and 147 connected to motor 119, so that whenever the magnetic switch 137 is closed the motor 119 operates, supplying coolant to the cutter.

Connected to one terminal of line 134 is a conductor 148 which extends to a normally open starting push button 149, the other side of this button being connected by a conductor 150 to a contact of a normally closed stopping push button 151, and from this same contact of the second push button a conductor 152 passes to the switch 137. From the other side of stop button 151 current may pass through a thermal overload circuit breaker 153, to the coil 154 controlling the magnetic switch 137, the circuit continuing through conductor 155, a second thermal overload switch 156, and a conductor 157, back to the end of line 136.

Thus, it will be seen that when starting push button 149 is depressed to complete the circuit, current flows through switch 149, conductor 150, push button 151, thermal overload circuit breaker 153, solenoid 154, conductor 155, thermal overload switch 156, conductor 157, back to the main line conductor 136, closing the contacts of the magnetic switch 137, and energizing conductors 138, 139 and 140 to operate motor 26. The closing of the magnetic switch also connects line 134 with conductor 152 in parallel with start button 149 and acting as a hold in when the button is released.

When it is desired to stop the motor 26, the push button 151 may be actuated, breaking the circuit and discontinuing the currrent to the coil 154 and so permitting switch 137 to open.

Connected to the opposite contact of switch 151 from conductor 152 is a conductor 158, one end of which is connected to switch 122. It is provided with a branch conductor 159 having its end connected to switch 126 and having another branch conductor 160 connected to switch 133.

It will be noted that conductor 158 may be energized by closing the starting switch 149 and is de-energized simultaneously with coil 154 by the opening of switch 151, so that the start and stop switches control all the circuits supplied by current through conductor 158.

From the other terminal of switch 122, a conductor 161 extends to one terminal switch 132, and from another contact of this latter switch a conductor 162 is connected to a conductor 163 having one end connected to a terminal of switch 121 and its other end connected to a terminal switch 127.

From the third terminal of switch 132 a conductor 164 extends, being attached to a conductor 165, one end of which is connected to the other terminal of switch 127, and the other end of which passes through a thermal overload switch 166, the coil 167 of a magnetic switch 168, a thermal overload switch 169, and a conductor 170, which is connected to one end of line 171, the other end of which is connected to line 136.

Lines 172 and 173 connect, respectively, lines 135 and 134 with the magnetic switch 168, and through the magnetic switch to conductors 174, 175 and 176 connected to the motor 111. Branch conductors 177 and 178 connected, respectively, to conductors 174 and 176, extend to the ends of the coil 179 of the magnetic brake 112.

A conductor 180 connects the second end of switch 126 with line 163.

A conductor 181 connects the second contact of switch 121 with the second contact of switch 133.

A conductor 182 extends from a third contact of switch 121 to a thermal overload relay 183, thence to the coil 184 of a magnetic switch 185, a second thermal relay 186, and a conductor 187 connected with one terminal of line 188, the other end of which is connected to line 136.

Lines 189 and 190 connect, respectively, lines 135 and 134 with the magnetic switch 185, while lines 191, 192 and 193 connect the corresponding terminals of this switch through a manual reversing switch 194 to the terminals of motor 79.

Branch conductors 195 and 196 connected, respectively, to conductors 191 and 193, are connected to the ends of the coil 197 of magnetic brake 90.

Thus, it will be apparent that current is supplied to motors 79 and 111 only after the actuation of the starting switch 149, and that such current is discontinued by the actuation of the stopping switch 151.

It will also be apparent that coils 179 and 197 are energized to retain their respective brakes 112 and 90 in inoperative position only while the motors 79 and 111 are operating.

The operation of the device is as follows: The operator presses the start push button 149 which permits current to flow through the magnet 154 of switch 137, closing this switch and supplying current to motors 26 and 119.

It simultaneously supplies current to line 158.

After inserting a piece of work in the chuck 198 and clamping it by rotating hand wheel 199, the operator moves lever 76 to his left, closing switch 122 and permitting switch 121 to establish a connection between conductors 181 and 182.

At this point of the operation, switch 133 is closed, so that current may flow through conductors 159 and 160, switch 133, conductor 181, switch 121 and conductor 182 to energize the coil 184 of magnetic switch 185, starting the motor 79.

Simultaneously, current passes through switch 122 and thence through conductor 161 to switch 132, then through conductors 162 and 163 to switch 127 and through this switch to conductor 165 connected to coil 167 of magnetic switch 168, closing this switch to energize motor 111 which retracts the cutter from depth so that it will clear the work during its return to its starting position.

As the motor 111 rotates to retract the cutter, cam 99 rotates, moving rod 123 to the left, as seen in Figure 12, so that when the cutter is fully retracted the cam will cause contact 125 to open switch 127 and contact 124 to close switch 126.

The opening of switch 127 breaks the circuit between conductors 163 and 165 and stops the motor 111.

Motor 79 continues to operate, moving the spindle to the left and carrying with it contacts 130 and 131.

When the spindle has reached its extreme position, these contacts will have moved switch 132 to establish the circuit between conductors 162 and 164, and have reopened switch 133, thus breaking the circuit between conductors 160 and 181 and discontinuing current through the latter to switch 121, conductor 182, and coil 184 of magnetic switch 185, thus causing this magnetic switch to open and stop motor 79.

The operator then releases lever 76, and its spring swings this lever to his right. This motion opens switch 122 and establishes the circuit between conductors 163 and 182.

Current now flows through conductor 159, switch 126, conductor 180, conductor 163, switch 121, and conductor 182 to coil 184 of magnetic switch 185, again closing this switch and causing the motor 79 again to operate.

The operator's action in releasing the lever and the rotation of this lever and its shaft have caused the yoke 74 to disengage the quick return clutch 71 and to engage the cutting clutch 69, so that the spindle is now driven in the opposite or cutting direction and at a lower rate of speed than was the case when the lever was retained by the operator to his left.

The release of the lever, of course, opens switch 122 but this does not effect the operation, inasmuch as the circuit controlled thereby has been broken at switch 132.

The actuation of switch 132 has now established a circuit between conductors 162 and 164, thence through conductor 165 to coil 167 of magnetic switch 168, again closing this switch and energizing motor 111 to feed the cutter in to depth, this motion, of course, being likewise imparted to the cam 89 and moving abutments 124 and 125 to the right, as seen in Figure 12. At the extreme position of these abutments, they open switch 126 and close switch 127.

The opening of switch 126 breaks the circuit between conductors 159 and 163, discontinuing the current to both coils 167 and 184, and stopping both motors 111 and 79, at which time the parts have progressed to their positions at the finish of the cut, and it is time for the operator to replace the work piece with a fresh one.

It will be noted that neither of the feed motors 79 and 111 can be operated until the cutter motor 26 has been started, thus insuring that the operator will not start the piece first and force the cutter and work into each other before the cutter is rotated.

While I have described the illustrated embodiment of my invention in some particularity, obviously many others will readily occur to those skilled in this art, and I do not, therefore, limit myself to the precise details shown and described, but claim as my invention all embodiments, variations, and modifications thereof coming within the scope of the appended claims.

I claim:

1. A machine tool comprising a tool holder, a rotatable work spindle, means for rotating said spindle, the tool holder and spindle being relatively adjustable axially, radially, and angularly, an externally threaded ring detachably secured to the spindle, a segment having a thread conjugate to the thread on said ring, and detachable securing means fixing said segment relative the tool holder, the threads of the segment and ring being in engagement.

2. A machine tool comprising two independently rotatable spindles, driving means connected to one of said spindles, separate driving means connected to the other spindle, feed means capable of relatively moving the spindles actuated by said second driving means, disengageable positive power transmission mechanism between the second mentioned driving means and the second mentioned spindle, a second disengageable power transmission mechanism capable of transmitting motion at a different rate of speed between the second mentioned driving means and the second mentioned spindle, and means for selectively alternately engaging said power transmission mechanisms.

3. A machine tool comprising two independently rotatable spindles, driving means connected to one of said spindles, separate driving means connected to the other spindle, feed means capable of relatively moving the spindles actuated by said second driving means, disengageable positive power transmission mechanism between the second mentioned driving means and the second mentioned spindle, a second disengageable power transmission mechanism capable of transmitting motion at a different rate of speed between the second mentioned driving means and the second mentioned spindle, and means for selectively alternately engaging said power transmission mechanisms, a second feed means capable of moving the spindles relatively in a different direction, and means controlling said second mentioned feed means in accordance with the operation of said power transmission mechanisms.

4. A machine tool comprising a rotatable spindle, driving means therefor, two power transmitting mechanisms between said driving means and said spindle arranged to rotate the spindle at different speeds relative to that of the driving means, clutch means for selective alternate engaging either of said transmission mechanisms, feed means actuated in accordance with the rotation of the spindle, a second feed means, interconnections between said clutch means and said second feed means causing the latter to operate in predetermined relation to the operation of the power transmitting mechanisms.

5. A machine tool comprising two spindles, a motor arranged to drive one of said spindles, a second motor arranged to drive the other of said spindles, two power transmission mechanisms interposed between said last mentioned motor and spindle capable of driving the spindle at different speeds relative the speed of its motor, clutch means for selectively engaging either of said power transmission mechanisms, a feed means, a third motor connected thereto, control means for the third motor actuated in accordance with the clutch means, and control means for the second and third motors actuated in accordance with the operation of the first mentioned motor.

6. A machine tool comprising two spindles, a motor arranged to drive one of said spindles, a second motor arranged to drive the other of said spindles, two power transmission mechanisms interposed between said last mentioned motor and spindle capable of driving the spindle at different speeds relative the speed of its motor, clutch means for selectively engaging either of said power transmission mechanisms, feed means operating in accordance with the rotation of said second mentioned spindle, control means actuated by said feed means, said control means controlling the second mentioned motor, a second feed means, a third motor connected thereto, control means for the third motor actuated in accordance with the clutch means, and control means for the second and third motors actuated in accordance with the operation of the first mentioned motor.

7. A machine tool comprising a base, stationary bearings carried thereby, a spindle rotatably supported by said bearings, ways upon the base extending in the direction of the axis of the spindle, a carriage slidable upon said ways, a slide mounted on the carriage and movable in a direction transverse to said ways, bearings carried by the slide, a spindle rotatably and slidably carried by said bearings, means for driving said spindles, a feeding element carried by said second mentioned spindle, a corresponding feeding element in engagement therewith and fixed with respect to said bearings, means for moving the slide on the carriage, and means for moving the carriage on the base.

8. A machine tool comprising a base, stationary bearings carried thereby, a spindle rotatably supported by said bearings, ways upon the base extending in the direction of the axis of the spindle, a carriage slidable upon said ways, a slide mounted on the carriage and movable in a direction transverse to said ways, bearings carried by the slide and angularly adjustable with respect to the motions of the carriage and slide, a spindle rotatably and slidably carried by said bearings, means for driving said spindles, a feeding element carried by said second mentioned spindle, a corresponding feeding element in engagement therewith and fixed with respect to said bearings, means for moving the slide on the carriage, and means for moving the carriage on the base.

9. A machine tool comprising a rotatable and axially translatable spindle, driving means therefor, power transmission mechanism interposed between the driving means and the spindle comprising two gear trains, a jaw clutch between one of said gear trains and the spindle, and a friction clutch between the other gear train and the spindle.

10. A machine tool comprising a rotatable and axially translatable spindle, driving means therefor, power transmission mechanism interposed between the driving means and the spindle comprising two gear trains, a jaw clutch between one of said gear trains and the spindle, a friction clutch between the other gear train and the spindle, and common control means for said clutches permitting engagement of only one at a time.

11. A machine tool comprising a rotatable and axially translatable spindle, driving means therefor, power transmission mechanism interposed between the driving means and the spindle comprising two gear trains, a jaw clutch between one of said gear trains and the spindle, a friction clutch between the other gear train and the spindle, threaded means carried by the spindle, and stationary threaded means in engagement therewith.

12. A machine tool comprising a rotatable and axially movable spindle, a threaded element carried by the said spindle, a stationary threaded element in engagement therewith, a gear fixed to the spindle, a worm in engagement with the gear, and driving means for rotating said worm, a clutch between the worm and the driving means, and manual means for rotating the worm.

13. A machine tool comprising a base, a slide movably supported thereby, a screw for moving the slide upon the base having a threaded portion engaging a threaded element fixed to the slide, a bearing stationary with respect to the base supporting the screw, a thrust bearing between the screw and stationary bearing, a second thrust bearing on the opposite side of the stationary bearing, a sleeve bearing upon said last mentioned thrust bearing and surrounding a portion of the screw, a collar fixed to the screw within the sleeve, a compression spring interposed between the collar and sleeve, automatic means for moving the sleeve, and manual means for rotating the screw within the sleeve.

14. A machine tool comprising a base, a slide movably supported thereby, a screw for moving the slide upon the base having a threaded portion engaging a threaded element fixed to the slide, a bearing stationary with respect to the base supporting the screw, a thrust bearing between the screw and stationary bearing, a second thrust bearing on the opposite side of the stationary bearing, a sleeve bearing upon said last mentioned thrust bearing and surrounding a portion of the screw, a collar fixed to the screw within the sleeve, a compression spring interposed between the collar and sleeve, a cam connected to move said sleeve, and manual means for moving the screw within the sleeve.

15. A machine tool comprising a rotatable work spindle, a tool holder, driving means for rotating the spindle about its axis, feed means actuated by the rotation of said spindle for moving the spindle and holder relatively in the direction of the axis of the spindle in two opposite directions, and independent feed means for moving the spindle and holder relatively in a direction transverse to the spindle axis.

16. A machine tool comprising two rotatable spindles, driving means connected to one of said spindles, independent driving means connected to the other said spindles, feed means actuated by said second driving means for feeding the spindle relatively in one direction, and control means permitting the second mentioned driving means to operate only while the first driving means is in operation.

17. A machine tool comprising a rigid stationary base, a spindle carried by said base and rotatable and axially movable with respect thereto, a threaded element detachably fixed to said spindle, a second threaded element having a thread conjugate to that of the first mentioned element and in engagement therewith fixed relative to said base, a holder carried by said base and fixed in relation thereto, and driving means connected to said spindle, a rotatable spindle carried by the holder, and driving means for said last mentioned spindle independent of said first mentioned driving means.

CHARLES H. SCHURR.